United States Patent Office 3,413,252
Patented Nov. 26, 1968

3,413,252
FLOOR POLISH COMPOSITIONS
Daniel A. Lima, Westport, Conn., assignor to FMC Corporation, New York, N.Y., a corporation of Delaware
No Drawing. Filed May 11, 1966, Ser. No. 549,188
1 Claim. (Cl. 260—28.5)

ABSTRACT OF THE DISCLOSURE

An improved polymer-emulsion floor polish containing from 0.1 to 1% of 3-methyl-2-oxazolidinone based on the solids content of the polish, to impart water resistance.

---

This invention relates to improved polymer-emulsion type floor polish compositions of the dry-bright type, and more particularly to the use in these polishes of 3-methyl-2-oxazolidinone to impart water-spot resistance to such compositions.

The use of polymer-emulsion type dry-bright floor polishes has increased rapidly in the past few years. Dry-bright floor polishes are generally aqueous emulsions comprising water-insoluble film former which is either wax or a waxy resin, with or without additional thermoplastic resin, together with a small percentage of a resin which can be solubilized in water by the use of ammonia, and which acts as a leveling agent, and a leveling additive which gives flexibility to the film and prevents crawling and cratering. Some floor polish compositions contain additional materials used to impart water-spot resistance to dried polish films; 2-pyrrolidone and other pyrrolidone derivatives have been used for this purpose. (These latter additives are frequently referred to as coalescing agents.)

Freshly applied dry-bright floor polishes are often subject to damage by water for up to about twenty-four hours after the polish dries. After 24 hours dried polish films generally have good water-spot resistance. Drops of water which fall on a freshly polished floor cause objectionable white spots to appear in the dry but new film. Therefore, floor polish additives which cause a floor polish to become water resistant in a short period of time are desired. There are very few compounds which are useful in making self-polishing floor polishes resistant to the damaging effects of water soon after application. 2-pyrrolidone when incorporated in the polymer-emulsion is effective in achieving this result and though less effective N-methyl pyrrolidone is also used.

One object of this invention is to provide dry-bright polymer-emulsion floor polishes with improved resistance to water spotting.

We have found, surprisingly, that 3-methyl-2-oxazolidinone is a superior material for imparting effective water resistance to self-polishing floor polishes. The N-methyl pyrrolidone is not as effective in achieving this result as 2-pyrrolidone. Therefore, it is quite surprising, based on the similarity of the N-substituted compounds, that the oxazolidinone is highly effective in imparting water resistance to the dried floor polishes.

3-methyl-2-oxazolidinone is used in floor polishes in rather low concentrations on the order of about 0.1 to 1% by weight depending on the solids content of the polish. The solids contents of the polish are generally on the order of 10–20% with optimum results obtained at about 15% solids with about 0.5% of the agent which improves the water-spot resistance of the dried polish films.

The water-insoluble film former may be wax, or wax substitute, such as carnauba, montan, paraffin, polyethylene, or microcrystalline waxes. These are generally blended with major quantities of thermoplastic resins such as polystyrene, polyacrylate, or polyacrylate-acrylonitrile resins. These resins are often sold blended with a small amount of shellac. The waxes and resins generally comprise about 75–90% of the total solids in the emulsion. Mixed with these materials are ammonia solutions of other thermoplastic resins, such as partially esterified modified phenolic resin and styrene/maleic copolymers, and other similar thermoplastic resins which are ammonia soluble. The ammonia solutions unify the film and level it somewhat, while the resins become water-insoluble together with the rest of the material on evaporation of the ammonia. These resins and formulations are well known in the trade, and are extensively described in the technical data bulletins of the various suppliers of the resins.

The following typical examples of formulations in accordance with this invention are given by way of example, and not by way of limitation.

Example 1

| | Parts by weight |
|---|---|
| Polystyrene polymer emulsion at 15% solids | 60 |
| Ammonia soluble resin at 15% solids | 20 |
| Polyethylene emulsion at 15% solids | 20 |
| Tri-butoxyethyl phosphate | 1.0 |
| Dibutyl phthalate | .5 |
| Ethylene glycol monoethylether | 1.0 |
| 3-methyl-2-oxazolidinone | .5 |

A film of the above polish was spread on vinyl and asbestos tile at the rate of about one gallon per thousand square feet. Gloss, leveling and water resistance of the polish film after drying for one hour were excellent, and removability from both substrates with a standard ammoniacal potassium oleate soap solution was quick and complete.

The styrene polymer of this example is an emulsion of styrene with a small amount of shellac, purchased at 49–51% solids as RCI 40–203 Synthemul, with a viscosity of 100–400 centipoises, weighing 8.6 to 8.8 pounds per gallon at a pH of 7.5 to 9.5. The solids content was reduced with water to 15% solids for use in the examples. The ammonia soluble resin was a rosin modified phenolic resin with a melting point of 148–154° C., an acid number of 180–190, and purchased as Shanco Resin L-1165. The polyethylene emulsion was a waxy grade, purchased at 40% solids as Poly-em 20 and reduced to 15% solids. The polyethylene emulsion was made from a solid polymer having a density of 0.91 to 0.93 gm./cc., an average molecular weight of 16,000 and an ASTM E-28 melting point greater than 200° C.

Example 2

Example 1 was repeated except that the 3-methyl-2-oxazolidinone was omitted. A film of this polish was spread on vinyl and asbestos tile at a rate of about one gallon per thousand square feet. The gloss and leveling of this film were excellent after drying for one hour, however, water resistance was poor as the film was attacked by water and showed severe whitening.

Example 3

| | Parts by weight |
|---|---|
| Acrylic emulsion at 40% solids | 19 |
| Water | 31 |
| Ammonia soluble resin at 15% solids | 25 |
| Polyethylene emulsion at 15% solids | 25 |
| Ethylene glycol monoethyl ether | 2 |
| Tri-butoxyethyl phosphate | 0.5 |

A film of the above polish was spread on vinyl and asbestos tile at a rate of about one gallon per thousand square feet. Gloss and leveling were rated excellent. This film showed excellent gloss and leveling, but only fair to poor water resistance after drying for two hours.

The acrylic polymer of this example is an acrylic emulsion purchased at 40% solids as RWL–201 from Morton Chemical Co. The emulsion weighed 8.75 pounds per gallon, had a specific gravity at 25° C. of 1.05, 3.5 pounds of solids per gallon, a pH of 5.0 to 6.0, a viscosity at 25° C. of 50 centipoises and polymer particle size of 0.04 micron. The ammonia soluble resin and polyethylene emulsion identified in Example 1 were used in this example.

Example 4

This example is similar in formulation to the one above.

| | Parts by weight |
|---|---|
| Acrylic emulsion at 40% solids | 19 |
| Water | 31 |
| Ammonia soluble resin at 15% solids | 25 |
| Polyethylene emulsion at 15% solids | 25 |
| Ethylene glycol monoethyl ether | 2 |
| Tri-butoxyethyl phosphate | 0.5 |
| 2-pyrrolidone | 0.5 |

A film of the above polish was spread on vinyl and asphalt tile at the rate of about one gallon per thousand square feet. Gloss and leveling was rated to be excellent. This film showed excellent gloss and leveling but only fair water resistance after drying for two hours. This composition had noticeably better water-spot resistance than Example 3.

The acrylic emulsion, ammonia soluble resin and polyethylene emulsion identified in Example 3 were used in this example.

Example 5

Example 4 was repeated, except that N-methyl pyrrolidone was substituted in the same amount for 2-pyrrolidone. This composition showed excellent gloss and leveling after drying for two hours but was inferior to Example 4 in resistance to water spotting. This composition showed better water resistance than Example 3 which did not contain any coalescing agent.

Example 6

Example 4 was repeated, except that 3-methyl-2-oxazolidinone was substituted in the same amount for 2-pyrrolidone. The gloss, leveling and water resistance of this film after drying for one hour were rated excellent. The water spot resistance was noticeably superior to Example 4.

It will be understood by those skilled in the art that many variations in the formulations of this invention may be developed without departing from the spirit and teachings of this invention.

I claim:
1. In a floor polish composition of the emulsion type consisting essentially of a water insoluble film former from the group consisting essentially of polystyrene, polyacrylate, and polyacrylate-acrylonitrile resins, a waxy material, a minor amount of an ammonia soluble leveling resin, a leveling agent, and a minor amount of a material which improves water resistance after drying of the polish film, the improvement which consists of using as the water resistant material 3-methyl-2-oxazolidinone 0.1 to 1% by weight based on the solids content of the polish.

No references cited.

MORRIS LIEBMAN, *Primary Examiner.*

H. S. KAPLAN, *Assistant Examiner.*